United States Patent [19]
Mai

[11] Patent Number: 5,511,870
[45] Date of Patent: Apr. 30, 1996

[54] RUBBER TRACK FOR VEHICLES

[75] Inventor: Renato Mai, Verona, Italy

[73] Assignee: Mai S.p.A., Verona, Italy

[21] Appl. No.: 218,645

[22] Filed: Mar. 28, 1994

[51] Int. Cl.⁶ .................................................. B62D 55/24
[52] U.S. Cl. ................................. 305/38; 305/35 R
[58] Field of Search .......................... 305/35 R, 35 EB, 305/38, 56, 57

[56] References Cited

FOREIGN PATENT DOCUMENTS

| | | | |
|---|---|---|---|
| 2-298296 | 11/1990 | Japan . | |
| 4002583 | 1/1992 | Japan | 305/38 |
| 4283178 | 10/1992 | Japan | 305/38 |
| 5032183 | 2/1993 | Japan | 305/38 |
| 5039067 | 2/1993 | Japan | 305/38 |
| 6144309 | 5/1994 | Japan | 305/38 |

Primary Examiner—Russell D. Stormer
Attorney, Agent, or Firm—Browdy and Neimark

[57] ABSTRACT

The rubber vehicle track comprises a rubber structure (1) exhibiting on an external surface a series of shaped reliefs (2) and on an internal surface a series of metal rail tracts (4) partially sunk into the rubber structure (1), projecting from said structure (1) and aligned one to another in at least one line to form a rigid rolling surface for vehicle rollers. Each rail tract (4) exhibits a longitudinal extension (6), made in rubber or in another elastic material, forming a single body with and being taller than the rail tract (4), and having a convex top surface. The rubber extension (6) is separated from a contiguous rail tract (4) by a recess (7) cut perpendicular to a lie plane of the internal surface of the rubber structure (1).

7 Claims, 4 Drawing Sheets

RUBBER TRACK FOR VEHICLES

BACKGROUND OF THE INVENTION.

The rubber track of the invention is especially applicable to excavators, combine harvesters and all vehicles which operate off-road but also need to be able to move on asphalted surfaces. The rubber used for the track prevents damage to an asphalted road surface, as well as being much quieter than metal tracks.

Known-type rubber tracks exhibit longitudinally-aligned vertically-projecting metal rail tracts on an inside surface of the tracks, and partially sunk into the rubber, which the vehicle-bearing wheels run on.

The rail tracts are distanced longitudinally such that when the track winds around the vehicle drive wheels the rail tracts do not interfere one with another.

This leads to a considerable drawback: when the vehicle-bearing wheels run on the rails, the spaces between tracts cause movement irregularities when the vehicle is translated, which are transmitted to the vehicle itself in the form of jumps and starts and small but constant vibrations.

To obviate this drawback, many track manufacturers have in some way done away with the spaces between the tracts of rail, creating what is in effect a constant rolling plane for the vehicle rollers. Japanese Patent no. 2-298296, granted on the 1.11.1990 in the name of Otsu Tire Ltd. is structurally the closest in type to the present invention. The rubber track exhibits aligned metal rails wherein situated between one and a next rail section is a rubber block, which is taller than the rails. When a roller runs off one metal rail tract it comes into contact with the top of the rubber block, compressing it so that it fills the space between the two rails. Thus the running plane of the rollers is constant and continuous and the above-mentioned vibrations are to some extent obviated.

This system undoubtedly functions well, but presents some drawbacks, especially in that the rubber block is completely independent of the rail tracts and therefore behaves like an isolated and independent cylinder, and al so in that it is subject to continuous compressions by the vehicle and is thus exceptionally susceptible to fast wear and breakage at its base. A further drawback is that the independence of the rubber block does not fully guarantee rolling continuity from rail tract to rubber block and vice versa.

The above invention also suffers from accumulations of stones, mud and such inert materials picked up from the work environment, which the vehicle picks up in the interspaces between the rubber blocks and the metal rail tracts.

SUMMARY OF THE INVENTION.

The principal aim of the present invention is to overcome the above-described drawbacks by providing a rubber track enabling the vehicle to translate normally, without vibrations due to discontinuity problems between tracts of rail, and which also enables inert materials to be eliminated instead of accumulating on the running planes of the rollers.

These and other aims are all attained by the rubber track of the invention, which comprises a rubber structure exhibiting on its external road-facing surface a series of shaped reliefs and on its internal surface a series of metal rail tracts, partially sunk into the rubber and projecting from the rubber surface, said tracts being set in aligned sequence along the track and forming at least one line along the track, and having the function of providing at least one track for the rollers of the vehicle to run on. Each of the metal rail tracts belonging to each line exhibits a rubber or other elastic material extension projecting further than the metal tract from the rubber track, and having a convex top surface. The rubber extension is made in a single piece with the metal rail tract and is separated from a next metal rail tract by a recess cut made substantially perpendicular to the lie plane of the rubber track.

BRIEF DESCRIPTION OF THE DRAWINGS.

Further characteristics and advantages of the present invention will better emerge from the detailed description that follows, of a preferred but non-exclusive embodiment here illustrated in the form of a non-limiting example in the accompanying drawings, in which.

Figure 1:
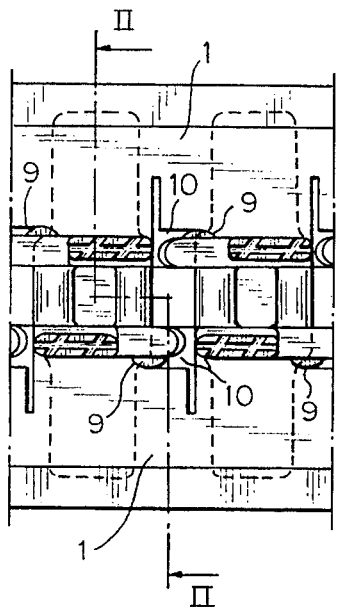
FIG. 1 shows a portion of the track of the invention, in a plan view from the internal side of the track.

FIGS. from 6 to 10 show the same views as FIGS. from 1 to 5, regarding a second embodiment of the invention;

FIGS. from 11 to 15 show the same views as FIGS. from 1 to 5, regarding a third embodiment of the invention;

FIGS. from 16 to 20 show the same views as FIGS. from 1 to 5, regarding a fourth embodiment of the invention.

DESCRIPTION OF THE PREFERRED EMBODIMENTS.

With reference to the FIGS. of the drawings, 1 denotes a portion of a rubber structure constituting a vehicle track. On its surface facing the road surface it exhibits a series of shaped reliefs 2, while on its surface facing the vehicle rollers it exhibits a series of metal elements 3 partially sunk into the rubber structure 1. The part of the metal elements 3 projecting perpendicularly from the rubber structure 1 forms a rail tract 4: several of the metal elements 3 are aligned longitudinally alone the track to form a field rolling plane for vehicle rollers (not illustrated).

In the embodiments shown in FIGS. from 1 to 10, the rail tracts 4 are situated in two parallel lines, while in the embodiments of FIGS. 11 to 20, two further parallel lines of rail tracts 5 are situated by the sides of the first pair of tracts 4, and are shorter in height than the tracts 4. The third and fourth embodiments are designed to support rollers of different heights, though all of known type.

Figure 2:
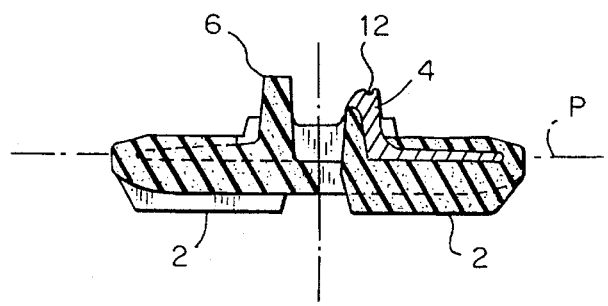
FIG. 2 shows a view of the section along line II—II of FIG. 1.
Figure 3:
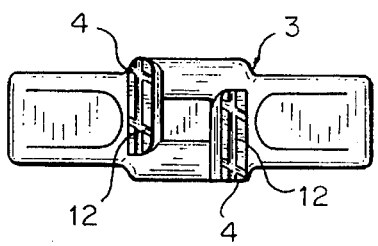
FIGS. 3 and 4 respectively show in plan view and perspective view one of the numerous metal elements which are sunk into the rubber of the track.
Figure 4:
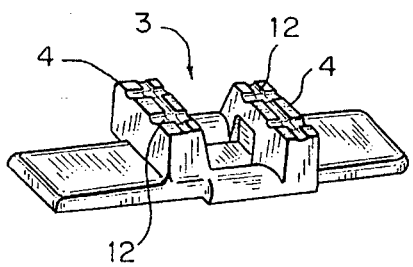
Figure 5:
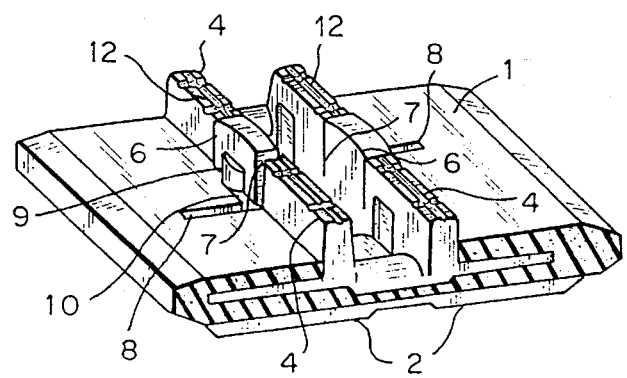
FIG. 5 shows a perspective view of the rubber portion of FIG. 1.
Figure 6:
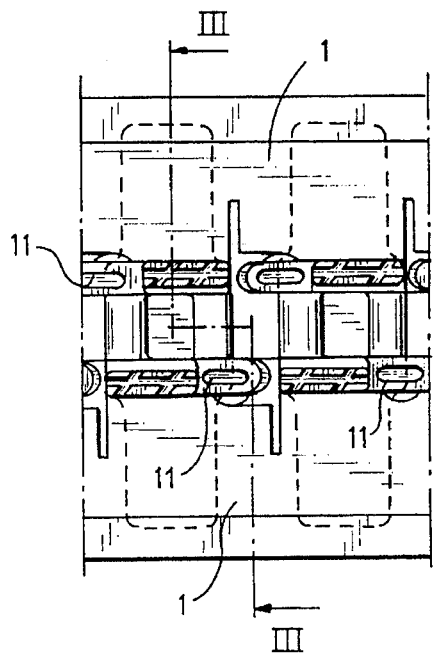
Figure 7:
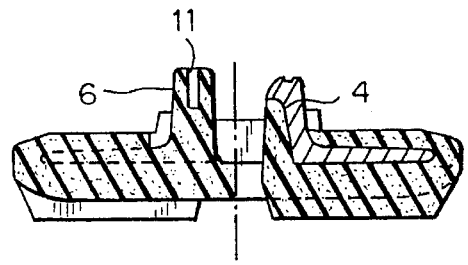
Figure 8:
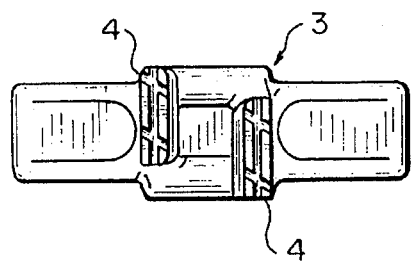
Figure 9:
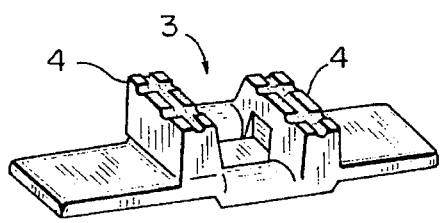
Figure 10:
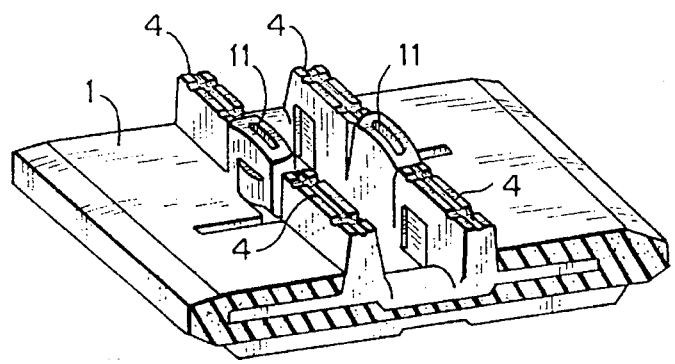
Figure 11:
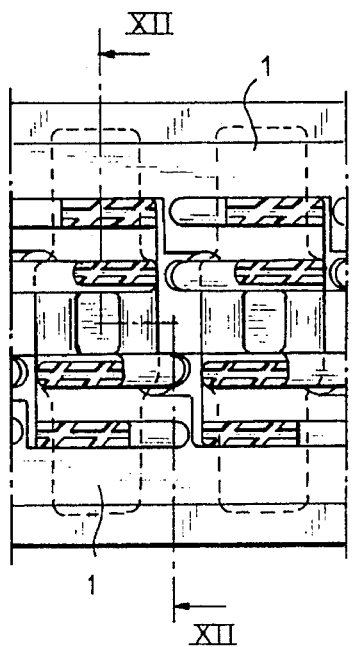
Figure 12:
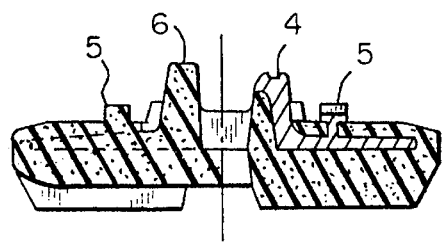
Figure 13:
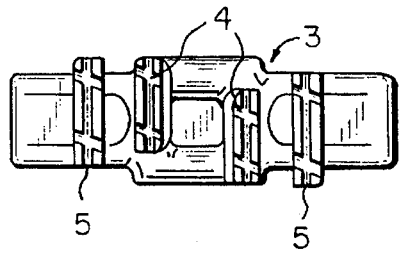
Figure 14:
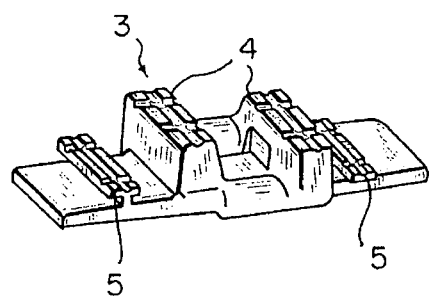
Figure 15:
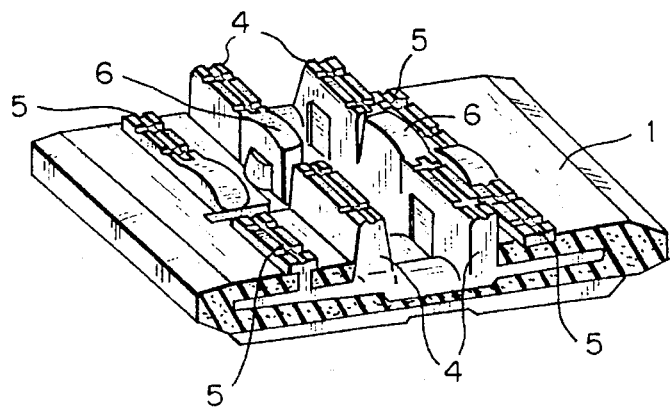
Figure 16:
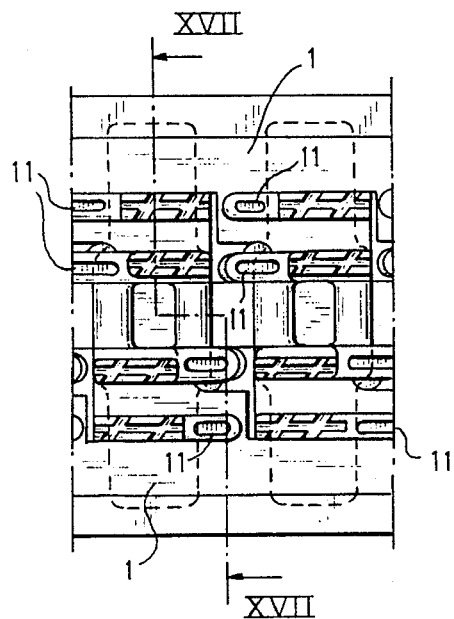
Figure 17:
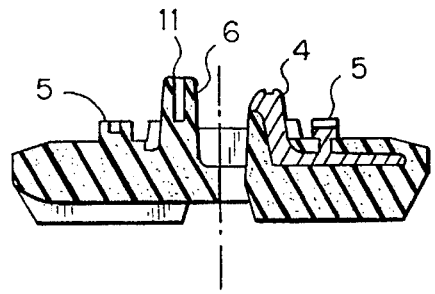
Figure 18:
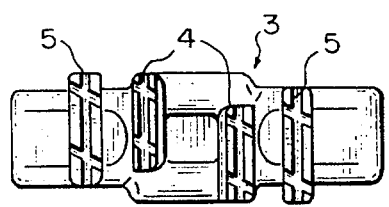
Figure 19:
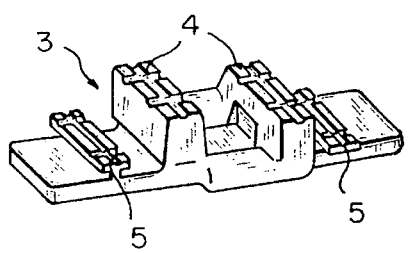
Figure 20:
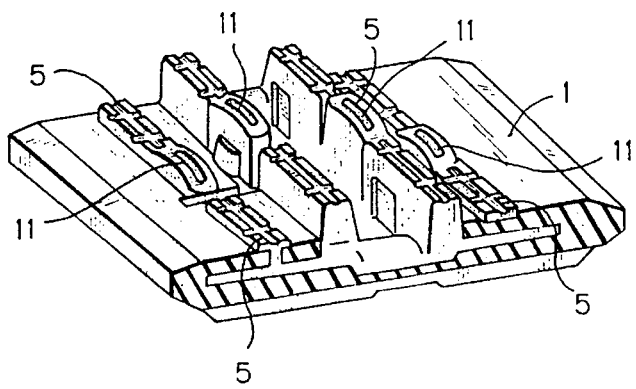

Each of the rail tracts 4 (or 5) longitudinally exhibits a rubber (or other elastic material) extension 6 which forms a single body with the rail tract 4 and which is taller than the tract 4 is (measuring from the rubber track internal surface, or level plane, i.e., the plane of the internal surface of the rubber structure 1 which lies against the under side of the middle element 3, as shown in FIG. 2 by a dashed line, and is generally parallel to the ground when the tract is laid out under the rollers of a vehicle). The rubber extension 6 has a convex top surface (see FIGS. 5, 10, 15, 20).

Each of the rubber extensions 6 is separated from a successive rail tract 4 by a recess 7 cut perpendicular to the surface of the rubber structure 1. Each recess 7 receives a part of the rubber extension 6 which is deformed when compressed by a roller passing over it, so that a continuous rolling plane is created.

Furthermore, at the point where the rail tracts 4 project from the rubber surface, each recess 7 extends transversally, cutting into the rubber structure 1. This recess extension (denoted in FIGS. 5, 10, 15 and 20 by number 8), affords the rail tracts 4 space in which to bend back when they meet the drive cogwheel or the endwheel. The rubber extensions 6 are also provided with a swelling 9 to strengthen their bases. In a position corresponding to the swellings 9, each recess 8 exhibits a cavity 10 to receive a swelling 9 when the rubber extension 6 is elastically deformed due to the action of the rollers.

In FIGS. 6, 10, 16 and 20, the rubber extensions 6 have a dead hole or blend hole 11 bored into them, having a perpendicular axis to the lie plane or ground plane of the rubber structure 1. The dead hole 11 enhances the deformability of the rubber extensions 6. Also worthy of note is that each rail tract 4 top surface has recesses 12 cut into it to improve drainage of inert materials, such as grit and mud.

What is claimed:

1. A rubber track for vehicles, comprising a rubber structure exhibiting on an external road-facing surface a series of shaped reliefs and on a vehicle-roller-facing internal surface a series of metal rail tracts, partially sunk into the rubber structure and projecting from said internal surface; said rail tracts being set in an aligned sequence along and forming at least one complete line along the internal surface, and providing at least one rigid plane for rollers of the vehicle to run on, wherein each of the rail tracts includes a longitudinally extending rubber extension, forming a single piece with the rail tract and projecting further than said rail tract from the internal surface, and having a convex inner surface; the rubber extension being separated from a following rail tract by a recess cut perpendicularly to a level plane rubber structure.

2. The rubber vehicle track as in claim 1, wherein the recess exhibits a recess extension extending into the rubber structure transversally to a line formed by a succession of rail tracts.

3. The rubber vehicle track as in claim 1, wherein the rubber extension exhibits a rubber swelling arranged laterally at a position where said rubber extension meets said level plane of the rubber structure.

4. A rubber vehicle track as in claim 3, wherein the rubber extension exhibits a recess extension affording a cavity situated in proximity of the rubber swelling.

5. A rubber vehicle track as in claim 1, wherein the rubber extension exhibits a blind hole bored into a top surface of the rubber extension, said blind hole having an axis which is perpendicular to the level plane of the rubber structure.

6. The rubber vehicle track as in claim 1, wherein each said rail tract has an inside surface exhibiting shaped recesses.

7. The rubber vehicle track as in claim 1, wherein the rubber extension is made of a first elastic material different from a second elastic material of a remainder of the rubber structure.

* * * * *